United States Patent
Herz et al.

(10) Patent No.: US 7,777,732 B2
(45) Date of Patent: Aug. 17, 2010

(54) MULTI-EVENT INPUT SYSTEM

(75) Inventors: Scott M. Herz, Santa Clara, CA (US); Roberto G. Yepez, San Francisco, CA (US); Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 656 days.

(21) Appl. No.: 11/619,595

(22) Filed: Jan. 3, 2007

(65) Prior Publication Data

US 2008/0158170 A1 Jul. 3, 2008

(51) Int. Cl.
*G06F 3/041* (2006.01)
(52) U.S. Cl. ....................... 345/173; 345/169
(58) Field of Classification Search ......... 345/156–178; 178/18.01–18.09
See application file for complete search history.

(56) References Cited

U.S. PATENT DOCUMENTS

| | | | |
|---|---|---|---|
| 4,071,691 A * | 1/1978 | Pepper, Jr. | 178/18.05 |
| RE34,187 E | 3/1993 | Yamanami et al. | |
| 5,706,028 A | 1/1998 | Murakami et al. | |
| 6,249,277 B1 * | 6/2001 | Varveris | 345/179 |
| 6,611,258 B1 * | 8/2003 | Tanaka et al. | 345/179 |
| 6,882,340 B2 | 4/2005 | Kanzaki et al. | |
| 7,023,427 B2 * | 4/2006 | Kraus et al. | 345/173 |
| 2003/0122787 A1 | 7/2003 | Zimmerman et al. | |
| 2003/0222858 A1 * | 12/2003 | Kobayashi | 345/173 |
| 2005/0017959 A1 * | 1/2005 | Kraus et al. | 345/173 |
| 2006/0026521 A1 | 2/2006 | Hotelling et al. | |
| 2006/0026536 A1 * | 2/2006 | Hotelling et al. | 715/863 |

(Continued)

FOREIGN PATENT DOCUMENTS

WO  WO-03/065192 A1  8/2003

(Continued)

OTHER PUBLICATIONS

Wacom, News Wacom, Wacom Penabled Cordless, Battery-free Pen Technology Featured in HP Tablet PC, Nov. 17, 2003, www.wacom.com/pressinfo/pdfs/HP_Wacom11_14_03.pdf.

(Continued)

*Primary Examiner*—Nitin Patel
(74) *Attorney, Agent, or Firm*—Morrison & Foerster LLP (57) ABSTRACT

Multi-event input systems, methods, and devices for use in connection with touch-sensitive electronic devices are disclosed. In accordance with certain embodiments of the present disclosure, a third state called "hover" can be achieved on a touch-base user interface device in addition to the states of pointer down and pointer up. In an embodiment involving a capacitive touch-sensing surface, one way to achieve the third state is for the user to contact the touchpad or touch screen with a non-flesh part of a finger, such as a fingernail, rather than the fleshy part of a finger. In other embodiments, the non-flesh part may comprise an electrically insulative layer covering a portion of a finger. The third state enables an adjunct system's user interface to achieve active navigation around the screen in a pointer-up (or left-up) input tool condition. One result is that mouseover pop-ups can be used on touch screen devices. Another result is that tooltips can be used on touch screen devices. Another result is that text can be selected using touch screen devices.

41 Claims, 12 Drawing Sheets

U.S. PATENT DOCUMENTS

| | | | |
|---|---|---|---|
| 2006/0097991 A1 | 5/2006 | Hotelling et al. | |
| 2006/0284858 A1* | 12/2006 | Rekimoto | 345/173 |
| 2007/0257890 A1 | 11/2007 | Hotelling et al. | |
| 2007/0257891 A1* | 11/2007 | Esenther et al. | 345/173 |
| 2007/0273670 A1* | 11/2007 | Nordahl | 345/173 |
| 2008/0015115 A1* | 1/2008 | Guyot-Sionnest et al. | 506/24 |
| 2008/0088593 A1* | 4/2008 | Smoot | 345/173 |
| 2008/0179507 A2* | 7/2008 | Han | 250/224 |
| 2008/0192024 A1* | 8/2008 | Mita | 345/173 |
| 2009/0040193 A1* | 2/2009 | Geaghan | 345/174 |

FOREIGN PATENT DOCUMENTS

| | | | |
|---|---|---|---|
| WO | WO-2007/108853 A2 | 9/2007 | |
| WO | WO-2007/108853 A3 | 9/2007 | |
| WO | WO-2008/083362 A1 | 7/2008 | |

OTHER PUBLICATIONS

Wacom, News Wacom, Two New Penabled A.T. Cross Executive Pens to Ship for Tablet PCs and Pen Tablets, Nov. 17, 2003, www.wacom.com/pressinfo/pdfs/cross.pdf.

Chinese Office Action mailed Mar. 28, 2008, for Chinese Application No. 2007201774024, filed Sep. 18, 2007, two pages.

European Search Report mailed Dec. 19, 2007, for EP Application No. 07019529.2, filed Oct. 5, 2007, six pages.

International Search Report mailed Apr. 10, 2008, for PCT Application No. PCT/US07/89166, filed Dec. 28, 2007, two pages.

Taiwanese Office Action mailed May 9, 2008, for Taiwanese Application No. 096214681, filed Aug. 31, 2007, two pages.

\* cited by examiner

MULTI-EVENT INPUT SYSTEM

CROSS-REFERENCE TO RELATED APPLICATIONS

The present invention is related to the following applications, which are hereby incorporated by reference: U.S. application Ser. No. 11/619,464 filed on even date herewith and entitled "Multi-Touch Input Discrimination" by Wayne C. Westerman; U.S. application Ser. No. 10/840,862 filed May 6, 2004 and entitled "Multipoint Touchscreen"; U.S. application Ser. No. 10/903,964 filed Jul. 30, 2004 and entitled "Gestures for Touch Sensitive Input Devices"; U.S. application Ser. No. 11/381,313 filed May 2, 2006 and entitled "Multipoint Touch Surface Controller".

BACKGROUND

The present invention relates generally to input systems, methods, and devices, and more particularly, to multi-event input systems, methods, and devices for use in connection with touch-sensitive electronic devices.

There currently exist various types of input devices for performing operations in a computer system. The operations, for example, may correspond to moving a cursor and making selections on a display screen. The operations may also include paging, scrolling, panning, zooming, etc. The input devices may include, for example, buttons, switches, keyboards, mice, trackballs, pointing sticks, joy sticks, touch surfaces (including touch pads and touch screens, etc.), and other types of input devices.

Various types of touch screens are described in one or more of the related applications cross-referenced above which are incorporated by reference herein. Touch screens typically include a touch panel, a controller, and a software driver. A touch panel generally includes a generally clear panel with a touch sensitive surface. The touch panel is positioned in front of a display screen so that the touch sensitive surface covers the viewable area of the display screen (usually the entire display area). The touch panel registers touch events and sends corresponding signals to the controller. The controller processes these signals and sends the data to the computer system. The software driver translates the touch events into computer events recognizable by the computer system.

SUMMARY

It has been discovered that current touch surface systems suffer from various disadvantages. For example, some touch screen systems are generally only responsive to either a touch or a lack thereof. That is, they are limited to two states and do not contemplate a third state. Accordingly, they cannot replicate all of the events that other types of input devices can generate. For example, a mouse input device is generally capable of generating more events than a conventional touch screen input system.

Other touch screen systems may be capable of distinguishing between a touch event, wherein a finger touches the touch screen, and a proximity event, wherein a finger is in close proximity to the touch screen but does not contact the touch screen. Such systems still suffer from a drawback in that they can generate touch events based on unintentional touches. For example, when a user's finger hovers over the touch screen and accidentally bumps into the screen, an unintentional generation of a touch event results.

In addition, design and development of various electronic devices have been driven by a demand for smaller and smaller form factors. This demand may be linked to a need or desire for ease of portability or mobility. Smaller devices naturally come equipped with smaller display screens. As well, the information presented in a relatively small display screen may be relatively dense. An adult finger, however, can be relatively large and imprecise.

A need therefore exists for systems, methods, and devices that provide for a touch surface that improves upon the prior art. Various embodiments of the present disclosure improve upon the prior art by providing for more robust touch surfaces that can recognize and distinguish different types of touch inputs. Accordingly, the number of types of input and the number of types of events are advantageously increased. In this manner, additional functionality can be achieved. Moreover, various embodiments of the present disclosure can also provide for increased precision in detecting touches. This can be particularly beneficial when used with devices having relatively small screens. Of course, increased precision can be beneficial when used with screens of any size.

Among other things, embodiments of the present disclosure provide multi-event input methods that discriminate between a first contact and a second contact, wherein the first contact is between a touch-surface display and a flesh surface and the second contact is between the touch-surface display and a non-flesh surface. The first contact is used to drive a first event, and the second contact is used to drive a second event. In some embodiments, the flesh surface may comprise a palmar aspect of a finger. In some embodiments, the non-flesh surface may comprise a fingernail. In some embodiments, the non-flesh surface may comprise an electrically insulative material coupled to a finger.

In accordance with other embodiments of the present disclosure, methods of using a touch-surface display arrangement are provided. The touch-surface display arrangement is touched with a flesh surface of a finger to drive a first event, and the touch-surface display arrangement is touched with a non-flesh surface of a finger to drive a second event.

In accordance with other embodiments of the present disclosure, computer-implemented methods for processing multiple types of touch inputs are provided. A contact between a touch-surface display and a surface of a finger is received. A determination is made whether the surface comprises a flesh aspect or a non-flesh aspect of a finger. If the surface comprises a flesh aspect, the contact is used to drive a first event. If the surface comprises a non-flesh aspect, the contact is used to drive a second event. The second event can be used to invoke various types of actions, such as a rollover, tooltip, selection of text, and many others.

In accordance with other embodiments of the present disclosure, touch input systems are provided which include a display device for displaying a graphical user interface and a touch surface operatively coupled to the display device, wherein the touch surface is configured to receive a plurality of types of touch inputs and is capable of distinguishing between a flesh contact and a non-flesh contact. The touch input systems may further include a device driver configured to receive touch input information from the touch screen and determine one or more input states. The touch input systems may further include a window server configured to receive information from the device driver pertaining to the one or more input states and to convert the information into one or more events for dispatch to an application. In some embodiments, the system may optionally comprise an imaging chip operatively coupled to the touch surface. In various embodiments, the input state may comprise any of the following: touching with flesh; not touching with flesh; in-range of a tracking area; and out-of-range of a tracking area. In various embodiments, the events may comprise any of the following: left mouse button down; left mouse button up; mouse entered a tracking area; mouse exited the tracking area; mouse moved without pressing the left mouse button; and mouse dragged while pressing the left mouse button.

In accordance with other embodiments of the present disclosure, portable electronic devices are provided. The electronic devices include a display device for displaying a graphical user interface and a touch screen positioned in front of the display device and configured to receive a plurality of types of touch inputs and is capable of distinguishing between a flesh contact and a non-flesh contact. The electronic devices may further include a device driver configured to receive touch input information from the touch screen and determine one or more input states. The electronic devices may further include a window server configured to receive information from the device driver pertaining to the one or more input states and to convert the information into one or more events for dispatch to an application. The electronic devices may further include a processor unit operatively coupled to the display device, wherein the application is executable within the processor unit. Examples of electronic devices include, for example, laptop computers, tablet computers, handheld computers, wrist-worn computers, PDAs (personal data assistants), smart phones, telephones and other communication devices, media players including music players and video players, game consoles, navigation devices, and exercise monitor devices.

In addition, program storage devices are provided, readable by a programmable control device, comprising instructions stored thereon for causing the programmable control device to perform one or more of the methods disclosed herein. As well, computer-readable media having computer-executable instructions for performing the methods disclosed herein are provided.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1A:
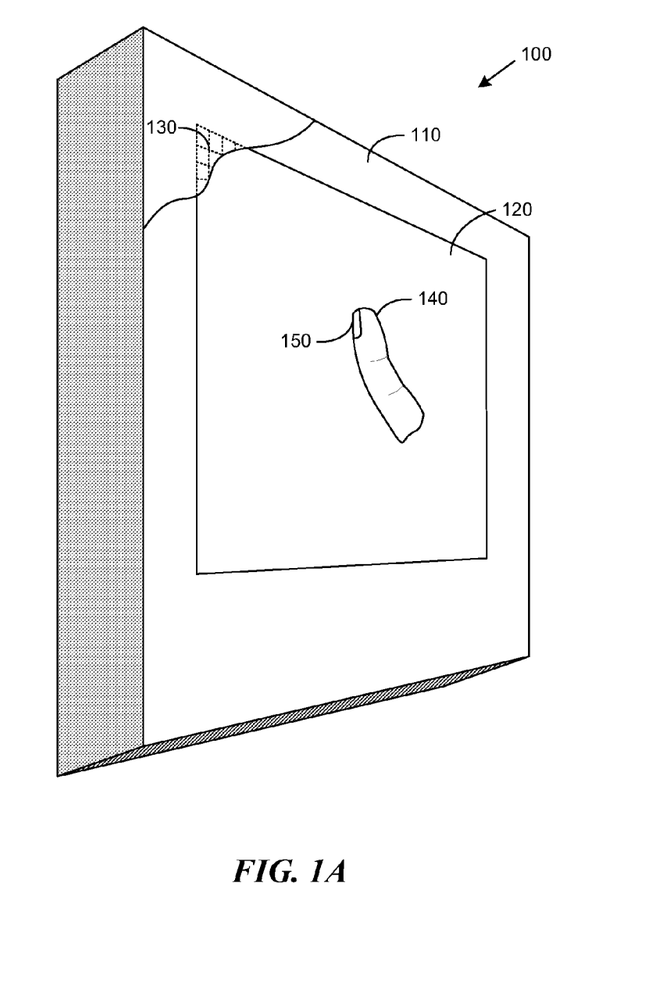
FIG. 1A depicts a perspective view of an exemplary display arrangement in accordance with various embodiments of the present disclosure.

Reference is now made to FIG. 1A, which depicts a perspective view with a partial cutaway of an exemplary display arrangement 100, in accordance with one embodiment of the present disclosure. In some embodiments, the display arrangement may be integral with an electronic device, while in other embodiments, the display arrangement may be a separate component that is communicatively coupled to an electronic device. The display arrangement 100 includes a display 110 and an optically transparent touch screen 120 positioned in front of the display 110. The display 110 is configured to display a graphical user interface (GUI). The GUI may include graphical and textual elements representing the information and actions available to the user. The transparent touch screen 120 comprises an input device that is sensitive to a user's touch, allowing a user to interact with the GUI on the display 110. By way of example, the touch screen 120 may allow a user to move an input pointer or make selections on the GUI by simply pointing at the GUI on the display 110.

In general, touch screens 120 recognize a touch event on the surface of the touch screen 120 and thereafter output this information to a host device. The host device interprets the touch event and thereafter performs an action based on the touch event. In some embodiments, the host device may comprise a computer such as, for example, a desktop computer, laptop computer, tablet computer, handheld computer, or wearable computer (such as on the wrist or arm, etc.). The host device may, however, comprise any of a number of types of devices, including, but not limited to, computers, PDAs, portable media players (such as audio players, video players, multimedia players, and the like), game consoles, smart phones, telephones or other communications devices, point-of-sale terminals, ATMs (automated teller machines), navigation devices, exercise monitors or other personal training devices, or other devices or combination of devices.

In one embodiment, the touch screen 120 includes a plurality of sensing elements 130. Each sensing element 130 (a.k.a. "pixel") in an array of sensing elements (i.e., a touch surface) generates an output signal indicative of the electric field disturbance (for capacitance sensors), force (for pressure sensors) or optical coupling (for optical sensors) at the sensor element. The ensemble of pixel values represents a "proximity image." As described herein, various embodiments of the disclosure address the ability to detect and discriminate between touch-surface signals (represented as a proximity image).

In some embodiments, the sensing elements may be based on self capacitance or mutual capacitance. In self capacitance, the "self" capacitance of a single electrode is measured as for example relative to ground. In mutual capacitance, the mutual capacitance between at least first and second electrodes is measured. In either case, each of the sensing elements works independently of the other sensing elements so as to produce simultaneously occurring signals representative of different points on the touch screen 120.

While various embodiments described herein may be provided in the context of mutual capacitance touch-surface devices, variations using other types of touch-surfaces such as force or optical sensing touch-surfaces, etc., will be readily apparent to those skilled in the art. Accordingly, the claims appended hereto are not intended to be limited by the disclosed embodiments, but are to be accorded their widest scope consistent with the principles and features disclosed herein.

Figure 1B:
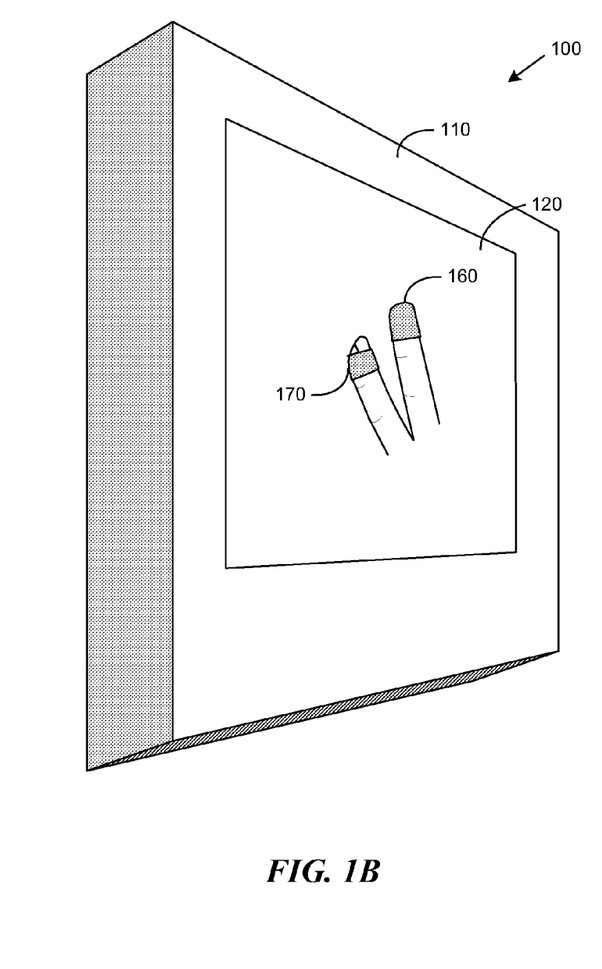
FIG. 1B depicts a perspective view of an exemplary display arrangement in accordance with various embodiments of the present disclosure.
Figure 1C:
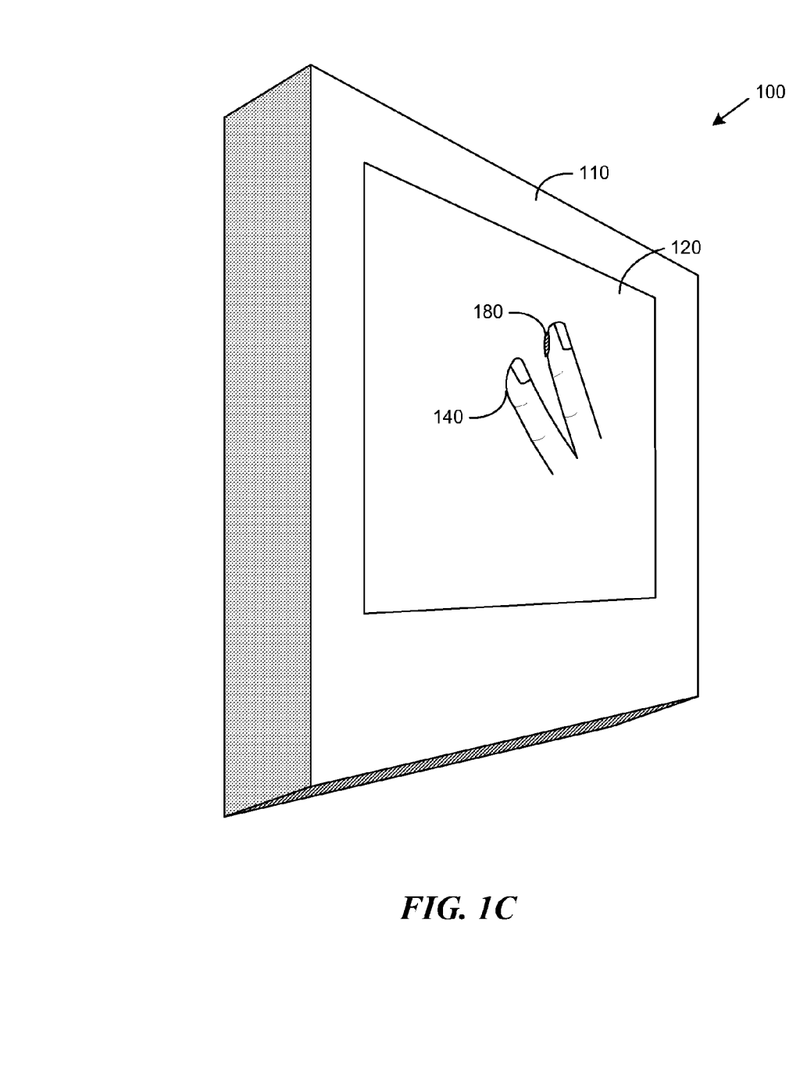
FIG. 1C depicts a perspective view of an exemplary display arrangement in accordance with various embodiments of the present disclosure.

Unlike conventional touch screens, the touch screen 120 is capable of recognizing multiple types of touch inputs. The touch screen 120 allows for handling of different events depending on what is used to touch the touch screen. In accordance with various embodiments of the present disclosure, the touch screen 120 is capable of distinguishing between a contact made by a flesh surface 140 of a finger and a contact made by a non-flesh surface of the finger, such as a fingernail 150, as described in more detail in U.S. Ser. No. 11/619,464 for "Multi-Touch Input Discrimination" which is cross-referenced above and incorporated by reference herein. The fingernail 150 may provide a more precise contact than a fleshy surface such as a fingertip. In other embodiments, the non-flesh surface may comprise an electrically insulative material of a suitable thickness coupled to the finger. For example, as depicted in FIG. 1B, the non-flesh surface may comprise a rubber finger cap 160 or sleeve 170 having a suitable thickness. It has been found that a thickness in the range of approximately 0.5 mm to approximately 1 mm is suitable, although other thicknesses may be suitable. As another illustrative example, as depicted in FIG. 1C, the non-flesh surface may comprise an adhesive layer 180 having a suitable thickness. The adhesive layer 180 may cover at least a portion of the flesh and may have a relatively small area, providing a more precise method of touching a touch surface. As another example, the non-flesh surface may comprise a partially fingerless glove, i.e., a glove that is missing one or some of its fingers or fingertips. In some embodiments, at least one of the glove fingers may have an insulated fingertip area, and at least another of the glove fingers may lack a fingertip portion to allow at least one of the user's fingers to be uncovered. An uncovered finger may be used to drive a first event system, i.e., one class of events, and a covered finger may be used to drive a second event system, i.e., a different class of events.

Figure 2:
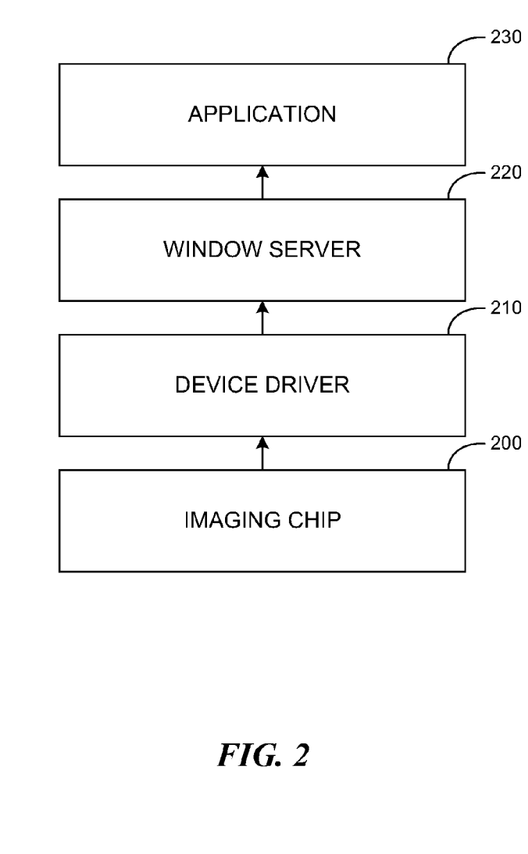
FIG. 2 depicts a block diagram of an exemplary touch event delivery system architecture in accordance with various embodiments of the present disclosure.

Reference is now made to FIG. 2, which depicts an exemplary architecture diagram of a touch event delivery system in accordance with various embodiments of the present disclosure. A first architecture layer may be comprised of an imaging chip 200. A device driver 210 receives low-level event data from the imaging chip 200 and provides an event record to a window server 220. The window server 220 converts the information into an event list which is dispatched to an application 230.

While certain layers are depicted and described in connection with FIG. 2, it will be appreciated by one of skill in the art that various additional layers may be included and various layers maybe excluded in accordance with various embodiments of the present disclosure. In addition, various layers may be combined or separated into further layers. For example, in some embodiments, the imaging chip 200 may be eliminated, and its functions may be performed by the device driver 210.

The imaging chip 200 detects approaches, touches, and retreats by flesh surfaces and non-flesh surfaces. The imaging chip layer 200 may perform imaging functions, proximity processing, and thresholding as described further in one or more of the cross-referenced applications listed above and incorporated by reference herein. In some embodiments, the imaging chip 200 may comprise a multi-touch sensor capable of detecting and distinguishing among various different types of input sources that may contact or be proximal to a touch surface, as described further in one or more of the cross-referenced applications listed above and incorporated by reference herein.

The device driver 210 receives event data from the imaging chip 200 and provides an event record to the window server 220. For example, data regarding whether an object is touching the touch surface may be provided. Furthermore, data regarding whether an object is in-range or out-of-range of a tracking area may be provided. The data may further include such items as how many fingers are detected, their locations, how hard they are pressing down, and many other items of information. In some embodiments, the device driver 210 comprises firmware. In other embodiments, the device driver 210 may comprise hardware or software or a combination.

In accordance with various embodiments of the present disclosure, various input states may be determined, and an expanded number of states may be achieved when a fleshy aspect and a non-fleshy aspect of a finger are used as distinguishable inputs. For example, in addition to a down state (corresponding to, e.g., touching with flesh) and an up state (corresponding to, e.g., not touching with flesh), an in-range state (corresponding to, e.g., hovering while approaching the touch surface) and an out-of-range state (corresponding to, e.g., hovering while retreating away from the touch surface) may also be provided.

If tracking an object, a bit indicating whether the object is in-range or out-of-range may be set to one (in-range) when the object is approaching a touch surface or hovering over the touch surface; the bit may be cleared (out-of-range) when the object is retreating away from the touch surface. Another bit (referred to as the "touch bit") may be used to indicate whether an object is in contact with the touch surface. In accordance with various embodiments of the present disclosure, if a fleshy surface touches the touch surface, the touch bit may be set to one; however, if a non-fleshy surface such as a fingernail touches the touch surface, then the touch bit may not be set, but the in-range bit will be set to one.

The window server 220 comprises software that receives the event record comprising the input state information from the device driver 210 and converts the received information into an event that the application layer 230 can handle. For example, if a fleshy aspect of a finger touches the touch surface and is then lifted from the touch surface, the window server 220 may interpret and convert those down and up events to the following event list which can be handled by the application layer 230: object (e.g., mouse, finger, hand, etc.) in-range; object down; object up; object out-of-range. In accordance with various embodiments of the present disclosure, an in-range event may be inserted before a down event, even if an in-range event was not detected. In addition, an out-of-range event may be inserted after an up event, even if an out-of-range event was not detected.

In accordance with various embodiments of the present disclosure, the input state information can be converted into the following types of events: EventLeftMouseDown (i.e., the left mouse button has been pressed); EventLeftMouseUp (i.e., the left mouse button has been released); EventMouseEntered (i.e., the mouse cursor has entered a tracking area); EventMouseExited (i.e., the mouse cursor has exited a tracking area); EventMouseMoved (i.e., the mouse has moved without pressing a mouse button); and EventLeftMouseDragged (i.e., the mouse has been moved while the left mouse button is pressed). Thus, in accordance with various embodiments of the present disclosure, mouse functionality can be achieved in an electronic device having a touch-surface input system, without the need for an actual mouse.

Reference is now made to FIGS. 3A-3D and 4A-4D, which depict several front plan views of a touch screen display arrangement 300. In the present example, a portion of a web page is displayed by a display 310. A first surface 320 of a user's finger 330 is used to interact with the touch screen 340. In the example shown in FIGS. 3A-3D, the first surface 320 of the finger 330 generally corresponds to a flesh surface of the finger 330. For example, the first surface 320 may generally correspond to the palmar (fingerprint) aspect of the finger 330.

Figure 4A:
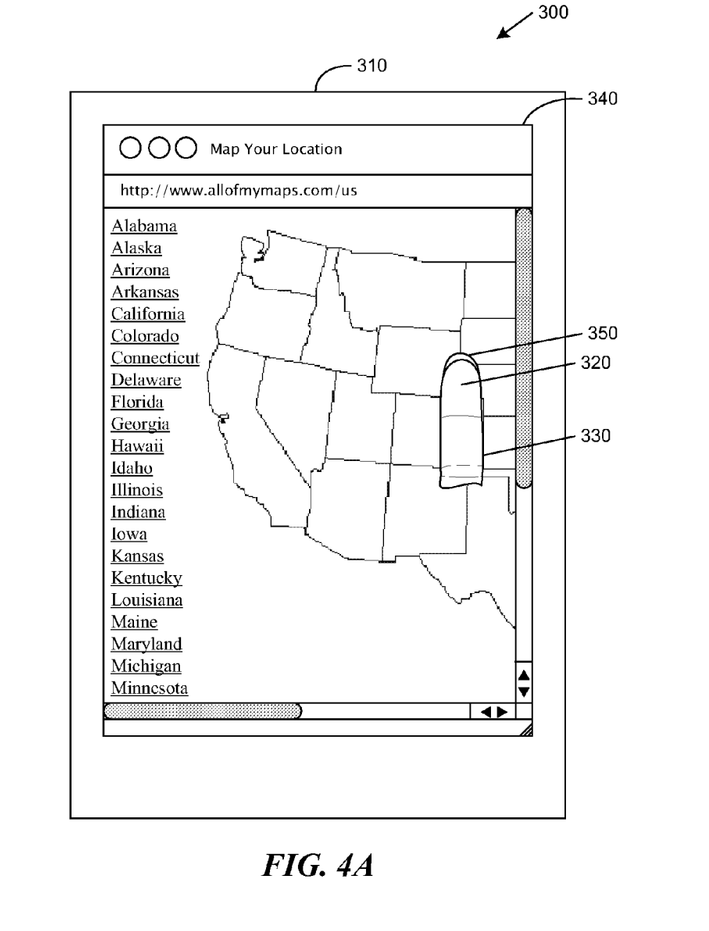
FIG. 4A depicts a front plan view of an exemplary touch screen display in accordance with various embodiments of the present disclosure.

In FIG. 4A, however, a second surface 350 is used to interact with the touch screen 340. In the example shown in FIGS. 4A-4D, the second surface 350 generally corresponds to a non-flesh surface of the finger 330. For example, the second surface 350 may generally correspond to the dorsal (fingernail) aspect of the finger 330. In other embodiments, the second surface 350 may comprise an insulator material of a suitable thickness coupled to the finger 330. For example, the second surface 350 may comprise a rubber finger cap or sleeve having a suitable thickness. As another illustrative example, the second surface 350 may comprise an adhesive layer applied to the finger 330. The second surface 350 of the finger 330 generates a different kind of contact that can be distinguished from the first surface 320 of the finger 330.

Figure 3A:
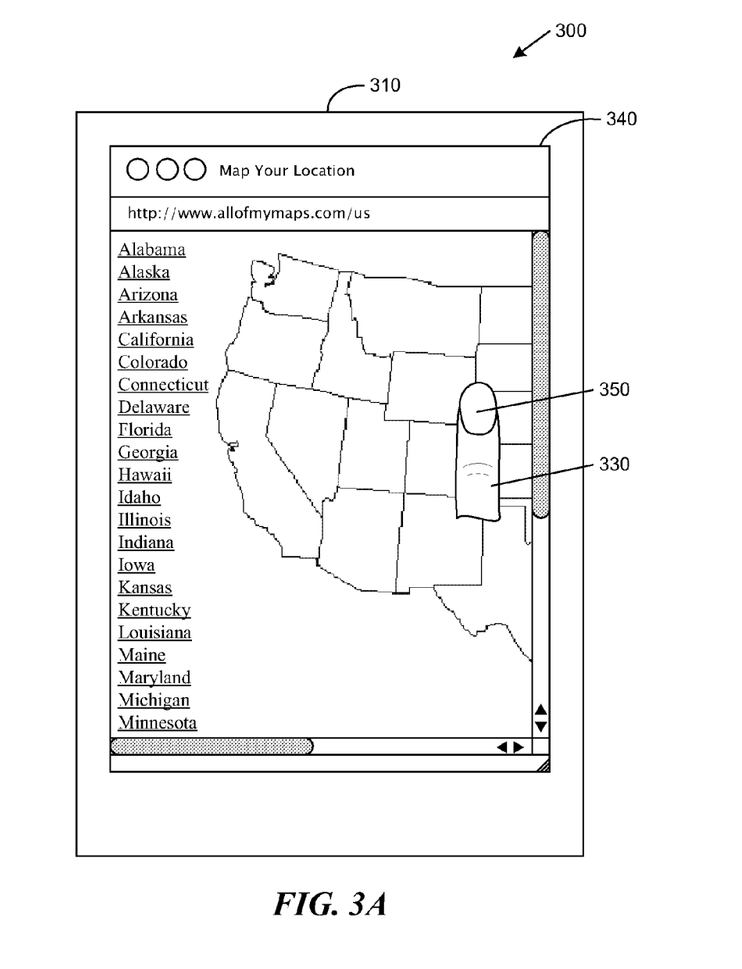
FIG. 3A depicts a front plan view of an exemplary touch screen display in accordance with various embodiments of the present disclosure.
Figure 3B:
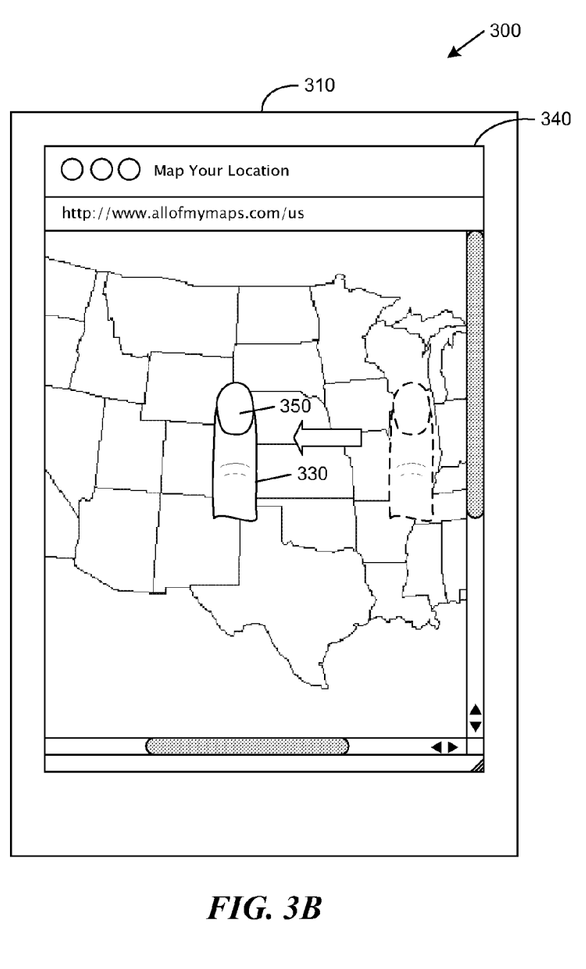
FIG. 3B depicts a front plan view of an exemplary touch screen display in accordance with various embodiments of the present disclosure.
Figure 3C:
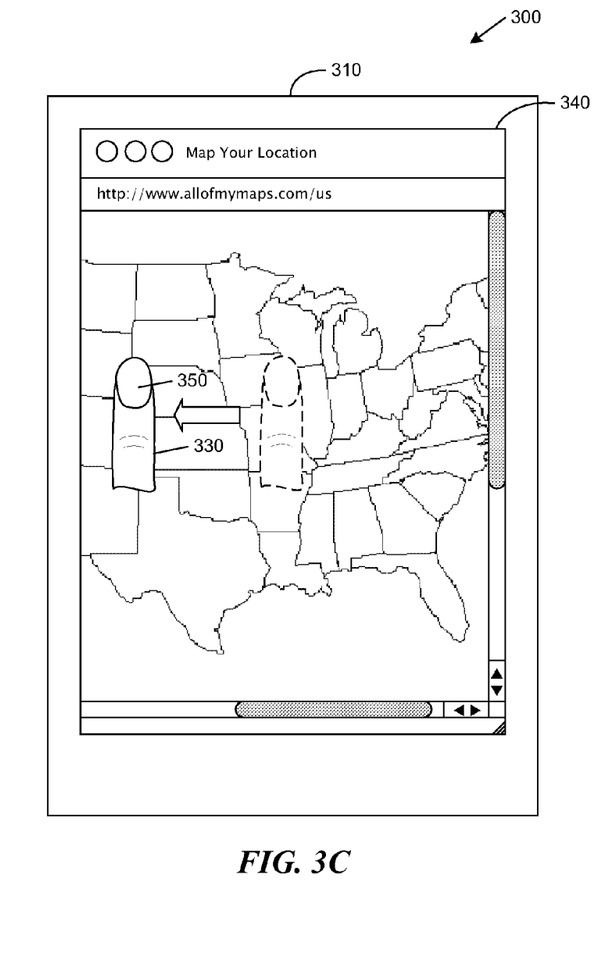
FIG. 3C depicts a front plan view of an exemplary touch screen display in accordance with various embodiments of the present disclosure.
Figure 3D:
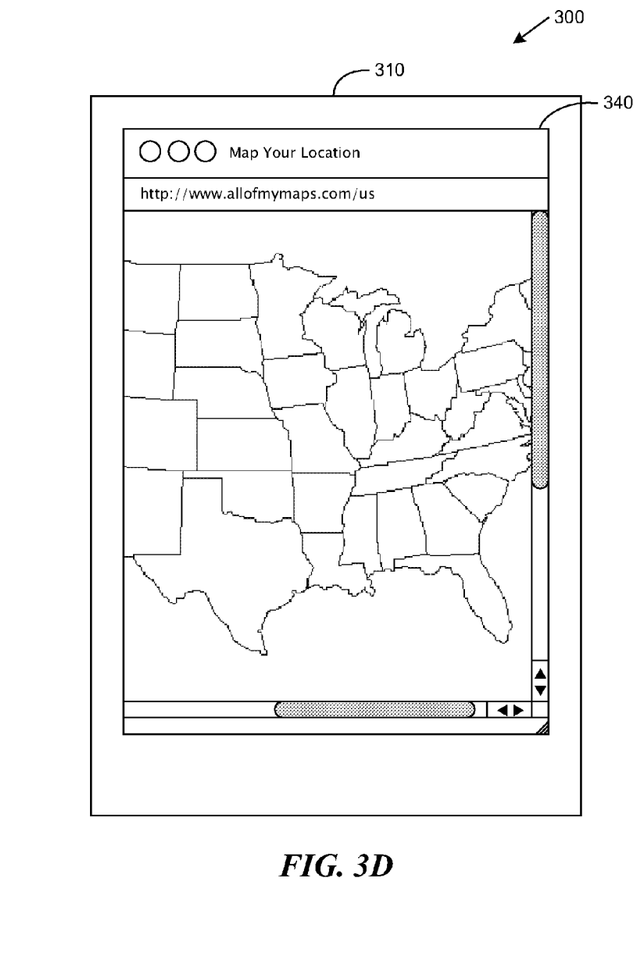
FIG. 3D depicts a front plan view of an exemplary touch screen display in accordance with various embodiments of the present disclosure.

Referring again to FIG. 3A, the first surface 320 of the finger 330 touches the touch screen 340 at time T1. The touch of the first surface 320 is detected and converted to a mouseDown event. Next, as shown in FIGS. 3B-3C, during time period T2, the finger 330 is dragged leftward across the touch screen 340. The dragging of the finger 330 is converted to a mouseDragged event. As the finger 330 is dragged across the touch screen 340, the presentation of the web page scrolls to the right. As a result, another portion of the web page is revealed, as illustrated in FIGS. 3B-3D. Finally, at time T3, the finger 330 is lifted away from the touch screen 340, which is detected and converted to a mouseUp event. Thus, as illustrated in this example, a flesh surface of the finger 330 can be used to drive a first event system. As shown in the foregoing example, the first event system may be used to effect translational movement across a screen.

Figure 4B:
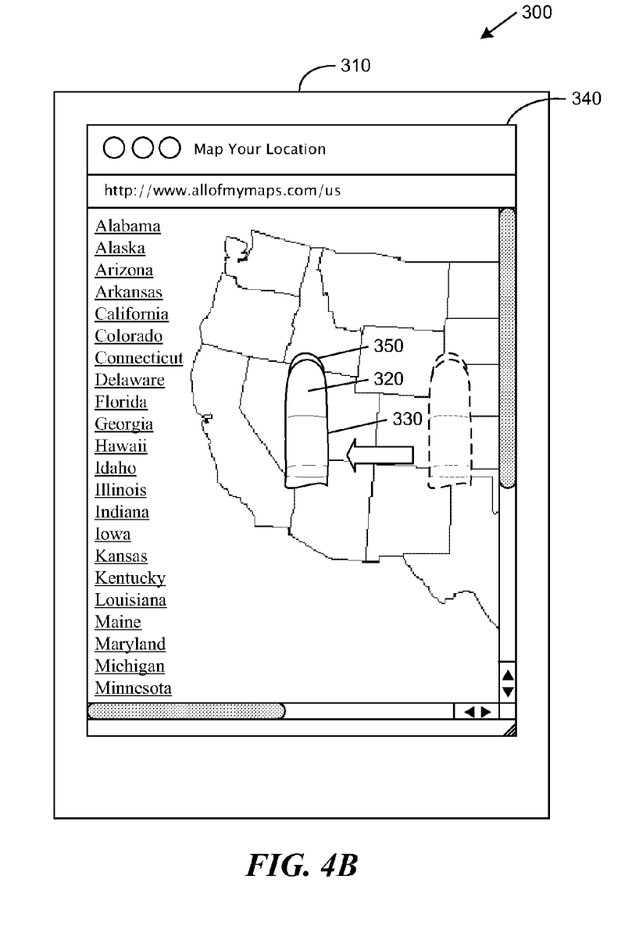
FIG. 4B depicts a front plan view of an exemplary touch screen display in accordance with various embodiments of the present disclosure.
Figure 4C:
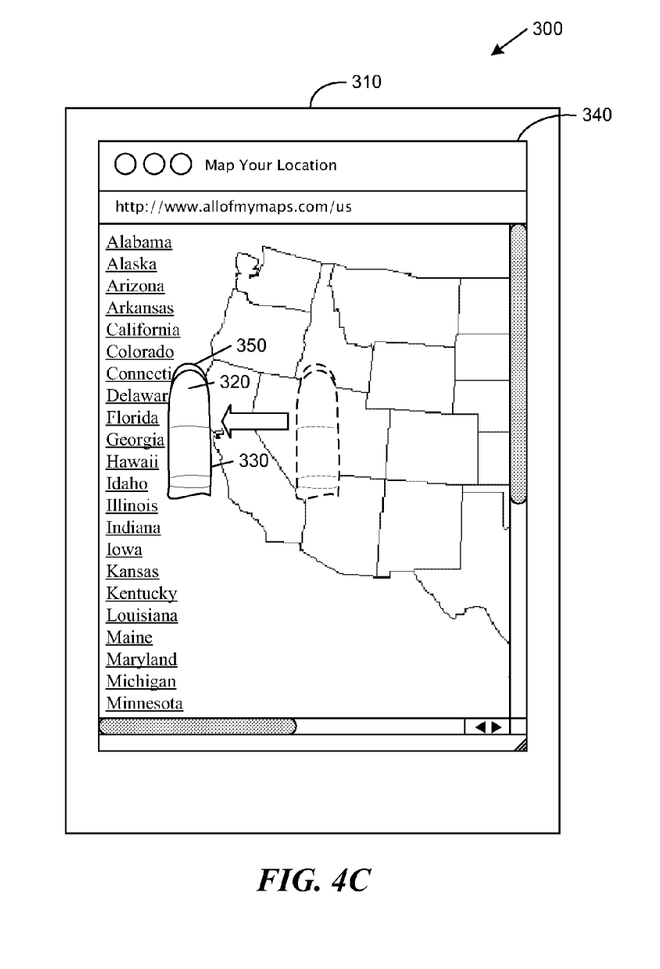
FIG. 4C depicts a front plan view of an exemplary touch screen display in accordance with various embodiments of the present disclosure.
Figure 4D:
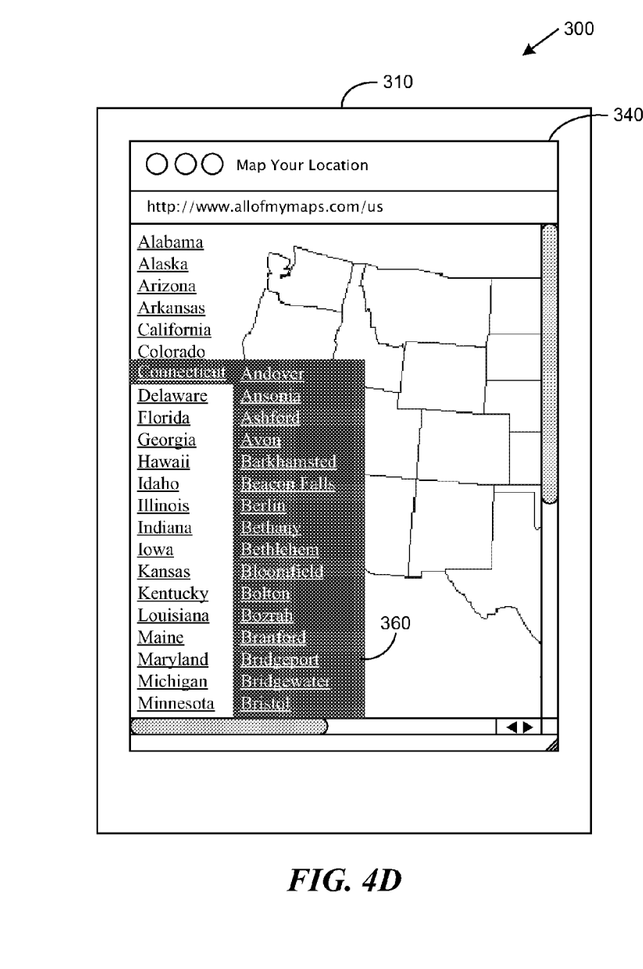
FIG. 4D depicts a front plan view of an exemplary touch screen display in accordance with various embodiments of the present disclosure.

Referring now to FIG. 4A, the second surface 350 of the finger 330 touches the touch screen 340 at time T4. The touch of the second surface 350 is detected and is converted to a mouseEntered event. Next, during time period T5, the finger 330 is dragged leftward across the touch screen 340, as shown in FIGS. 4B-4C. The dragging of the finger 330 is converted to a mouseMoved event. As a result, a rollover (also referred to as a mouseover) menu 360 may be displayed, as illustrated in FIG. 4D. At time T6, the finger 330 is lifted away from the touch screen 340, which is detected and converted to a mouseExited event. Thus, the second surface 350 of the finger 330 (e.g., the fingernail) can be used to drive a second event system. As shown in the foregoing example, the second event system may comprise hover events, e.g., mouseEntered, mouseMoved, and MouseExited.

As another illustrative example, in a maps application, while dragging with the first surface of the finger may be used to pan the map, dragging with the second surface of the finger may be used to make a zoom box, which zooms to show the contents of the box.

As another illustrative example, the first surface of the finger may be used to move a text cursor. Dragging with the second surface of the finger may be used to select text.

As another illustrative example, the second surface of the finger may be used drive tooltips. A tooltip (sometimes referred to as a screentip) is a GUI element comprising text that provides information about a view. For example, a web browser tooltip can be displayed when the second surface of the finger is in-range of a tracking area for a hyperlink.

As another illustrative example, tapping an application icon with the first surface of the finger may be used to launch an application, whereas dragging with the second surface of the finger may be used to configure an icon grid, i.e., reorder them, etc.

Figure 5A:
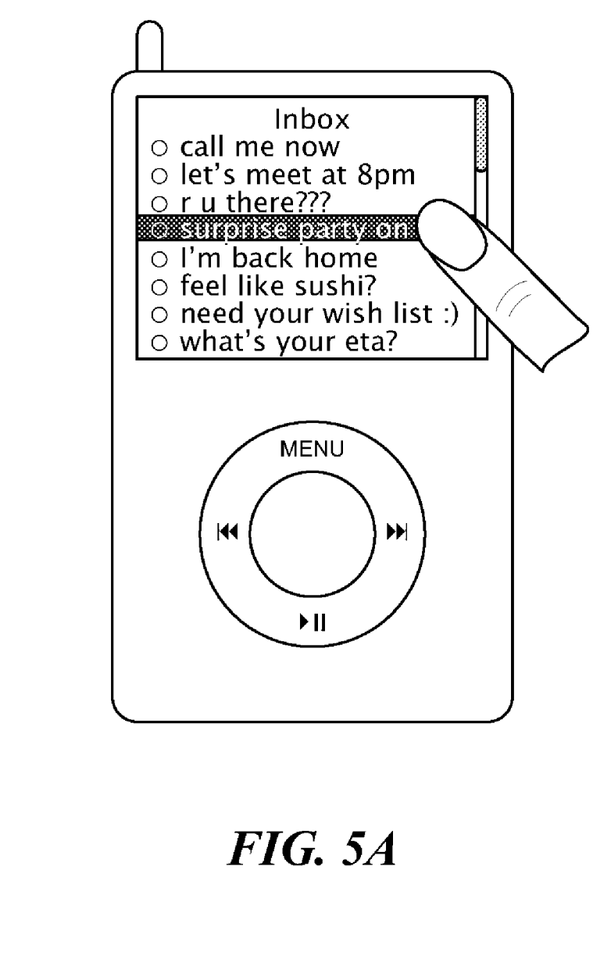
FIG. 5A depicts a front plan view of an exemplary handheld electronic device in accordance with various embodiments of the present disclosure.
Figure 5B:
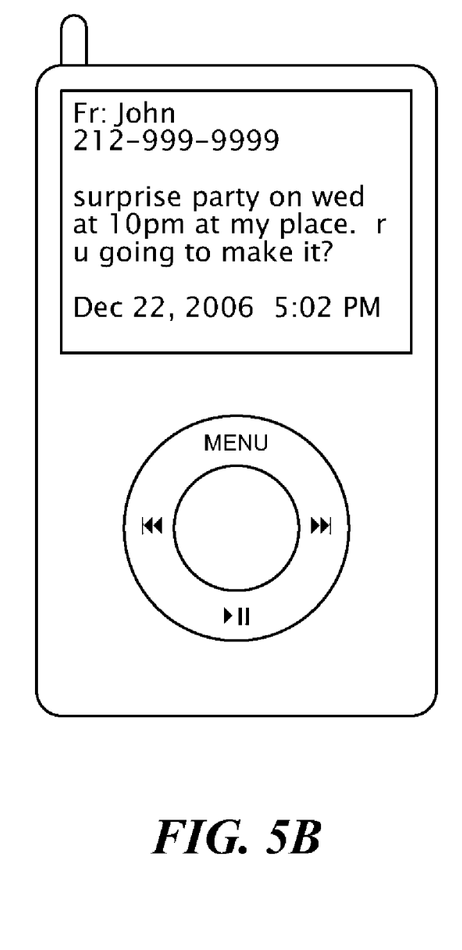
FIG. 5B depicts a front plan view of an exemplary handheld electronic device in accordance with various embodiments of the present disclosure.
Figure 6A:
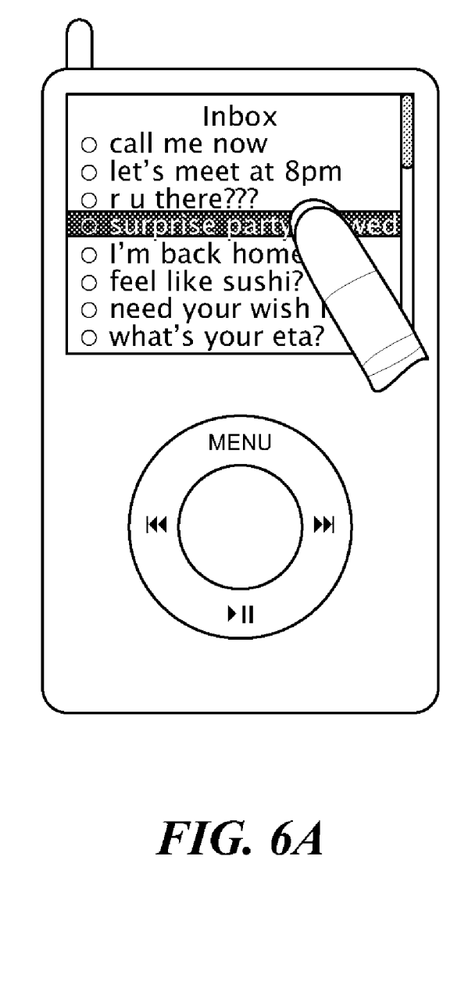
FIG. 6A depicts a front plan view of an exemplary handheld electronic device in accordance with various embodiments of the present disclosure.
Figure 6B:
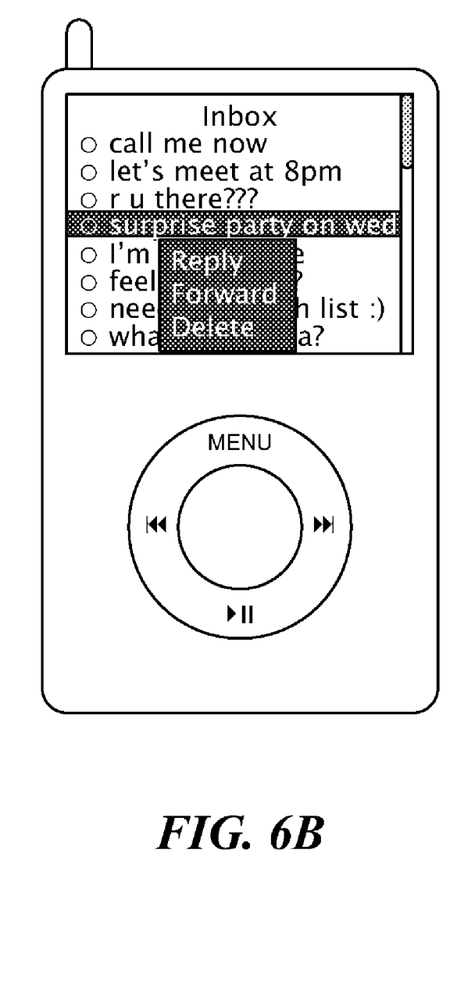
FIG. 6B depicts a front plan view of an exemplary handheld electronic device in accordance with various embodiments of the present disclosure.

As yet another illustrative example, tapping with the second surface of the finger may be used to bring up an action menu. For example, tapping with the first surface of the finger on a row entry may be used to display the selected item. Tapping with the second surface of the finger may be used to display another set of actions, such as less frequently invoked actions. For example, as shown in FIG. 5A, tapping with the first surface of the finger on an SMS (short message service)

message may be used to display the message, as shown in FIG. 5B. Tapping the message with the second surface of the finger, as shown in FIG. 6A, may be used to display various actions, such as, for example, reply, delete, or forward, etc., as shown in FIG. 6B.

As still another illustrative example, an on-screen keyboard, or soft keyboard, may be displayed on a touch screen display. Tapping on an on-screen keyboard key with the first surface of the finger may be used to type the lower case version of a letter, whereas tapping on the key with the second surface of the finger may be used to type the upper case version of the letter.

As yet another illustrative example, in an on-screen keyboard, tapping the shift key with the first surface of the finger may be used to enable caps for a single letter, whereas tapping the shift key with the second surface of the finger may be used as a caps lock. Tapping the shift key again with the second surface of the finger may be used to unlock caps.

As yet another illustrative example, in an on-screen keyboard, tapping on the delete key with the first surface of the finger may be used to delete the last letter, whereas tapping on the delete key with the second surface of the finger may be used to delete the last word.

As yet another illustrative example, in a calendar application, tapping with the first surface of the finger on a "next" button to view the next item may be used to jump ahead by a day, whereas tapping on "next" with the second surface of the finger may be used to jump ahead by another unit, such as a week.

As yet another illustrative example, in a photo application, dragging with the first surface of the finger may be used to pan around an image, whereas dragging with the second surface of the finger may be used to show a crop UI.

Figure 7A:
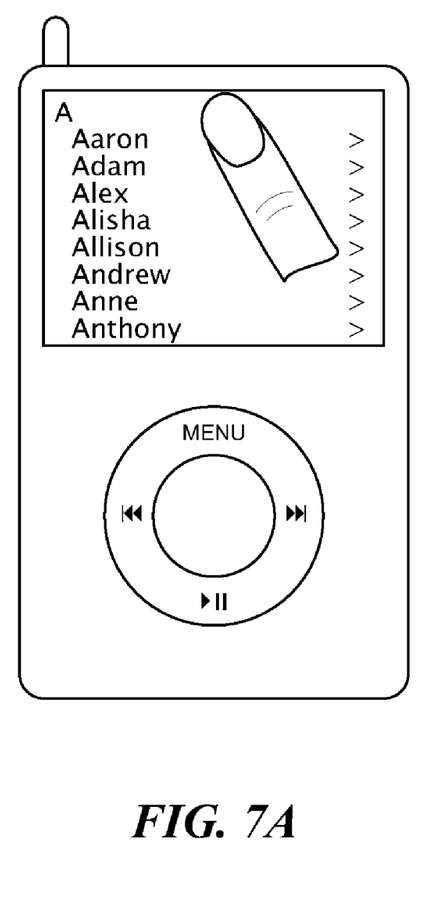
FIG. 7A depicts a front plan view of an exemplary handheld electronic device in accordance with various embodiments of the present disclosure.
Figure 7B:
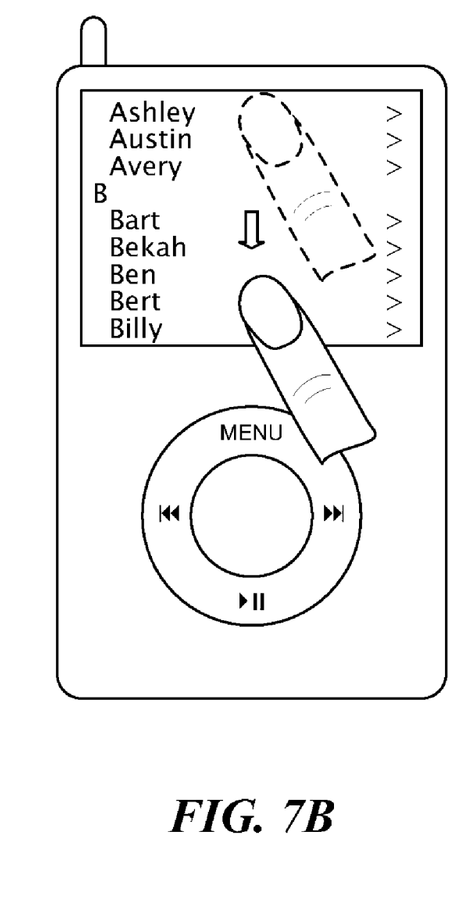
FIG. 7B depicts a front plan view of an exemplary handheld electronic device in accordance with various embodiments of the present disclosure.
Figure 8A:
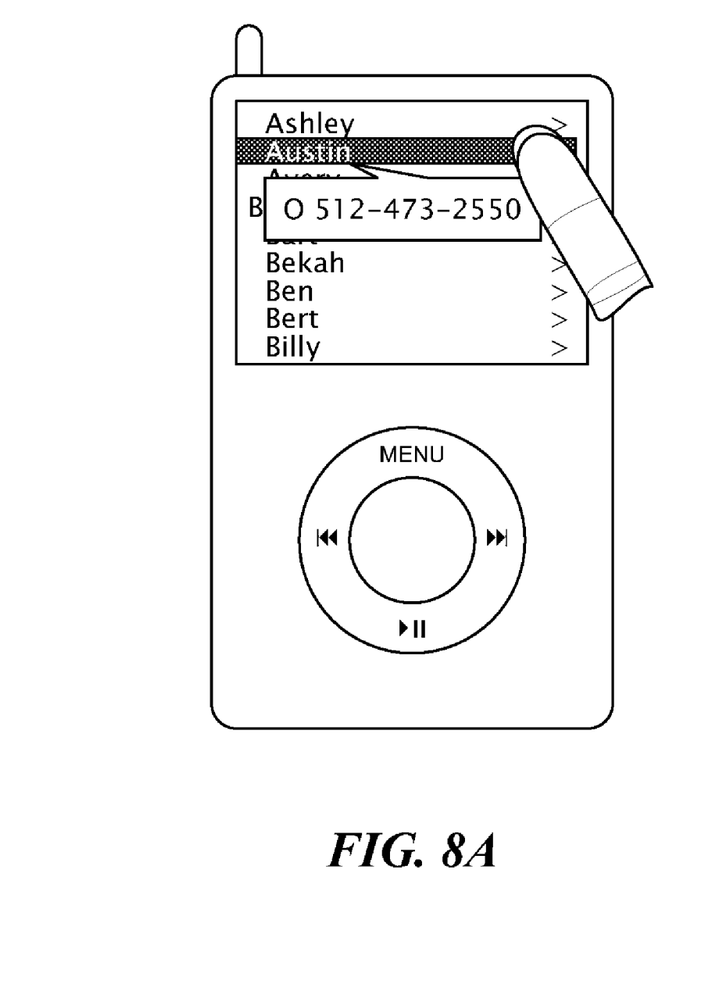
FIG. 8A depicts a front plan view of an exemplary handheld electronic device in accordance with various embodiments of the present disclosure.
Figure 8B:
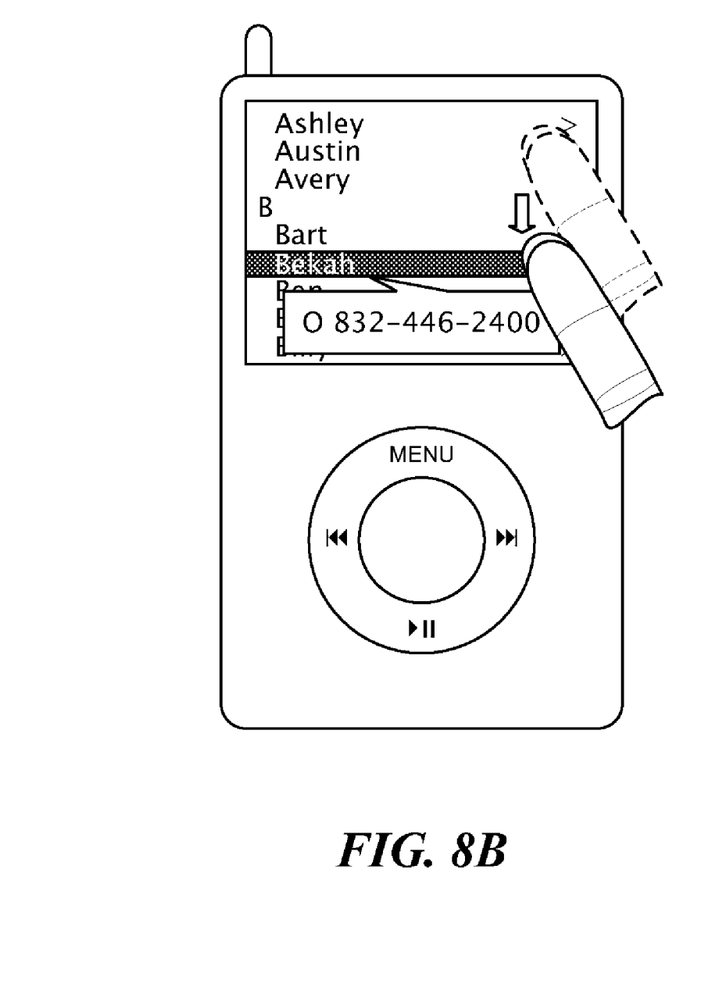
FIG. 8B depicts a front plan view of an exemplary handheld electronic device in accordance with various embodiments of the present disclosure.

As yet another illustrative example, in a mail, phone, address book, or other application having contact information, dragging with the first surface of the finger may be used to scroll through a list, as shown in FIGS. 7A-7B, whereas dragging with the second surface of the finger may be used to show a favorite phone number tooltip for each person the finger slides over for quick access, as shown in FIGS. 8A-8B.

Figure 9A:
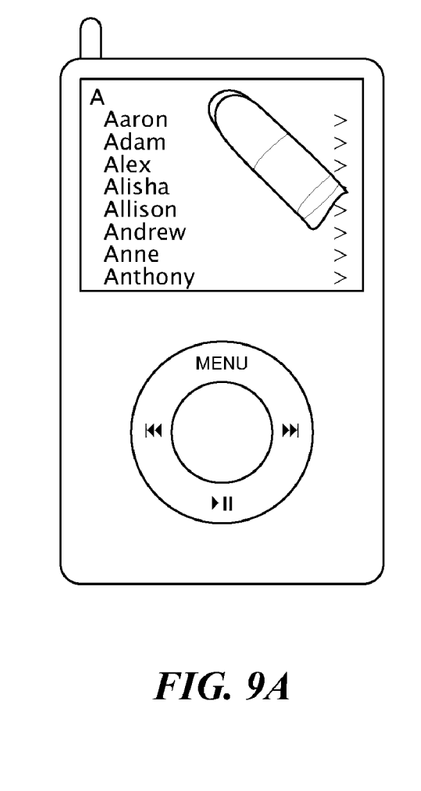
FIG. 9A depicts a front plan view of an exemplary handheld electronic device in accordance with various embodiments of the present disclosure.
Figure 9B:
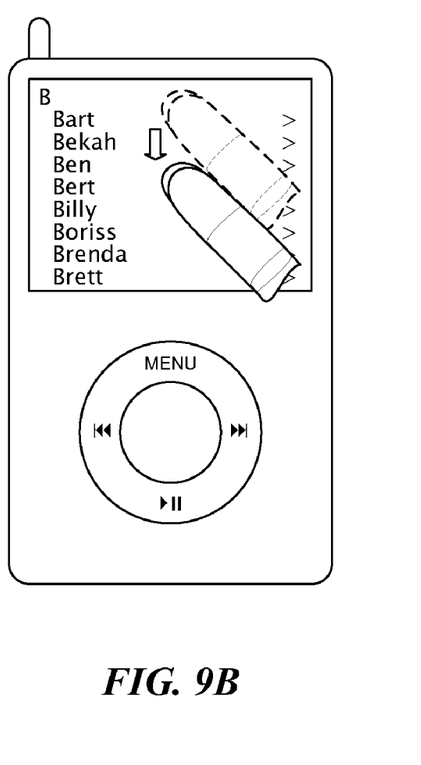
FIG. 9B depicts a front plan view of an exemplary handheld electronic device in accordance with various embodiments of the present disclosure.
Figure 9C:
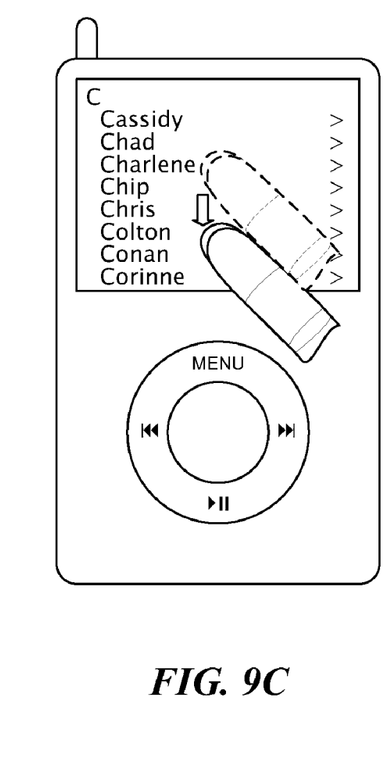
FIG. 9C depicts a front plan view of an exemplary handheld electronic device in accordance with various embodiments of the present disclosure.

As yet another illustrative example, in contacts, dragging with the second surface of the finger may be used to jump to the next letter in a list of contacts. Likewise, in a media player application, dragging with the second surface of the finger may be used to jump to the next letter in a list of artists or titles. For example, if on As, as depicted in FIG. 9A, dragging with the second surface of the finger may be used to jump to Bs, as depicted in FIG. 9B, then to Cs, as depicted in FIG. 9C, and so on. Accordingly, advanced or accelerated navigation through a long list can be advantageously achieved.

As still another illustrative example, in a phone application, tapping the delete key with the first surface of the finger can be used to delete one digit, whereas tapping the delete key with the second surface of the finger can be used to delete the whole phone number.

Figure 10A:
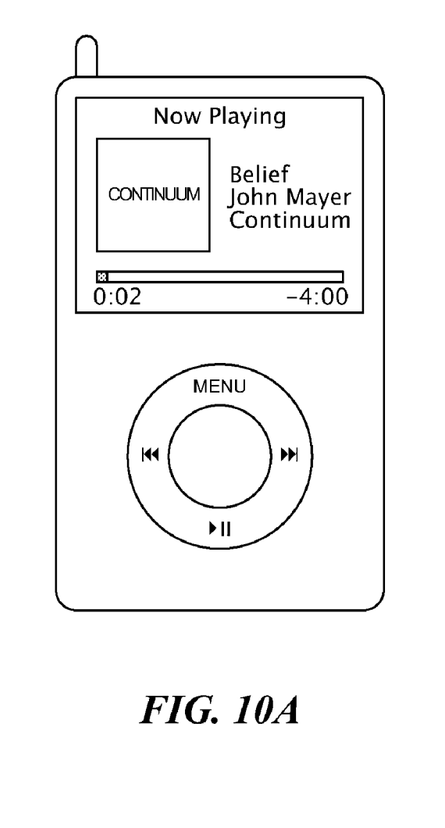
FIG. 10A depicts a front plan view of an exemplary handheld electronic device in accordance with various embodiments of the present disclosure.
Figure 10B:
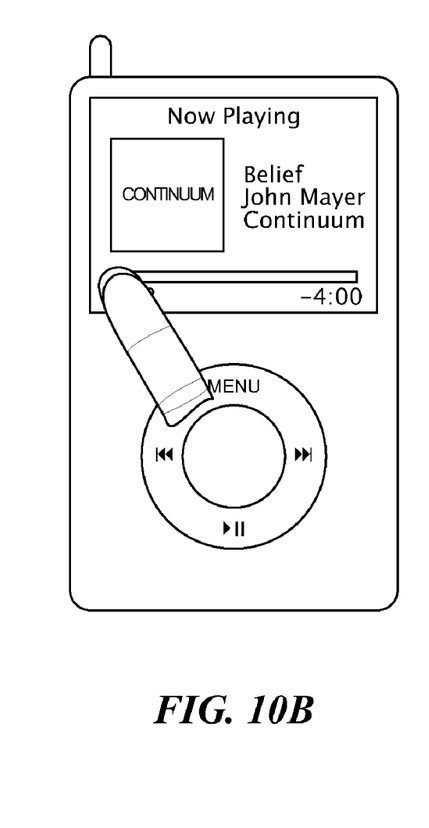
FIG. 10B depicts a front plan view of an exemplary handheld electronic device in accordance with various embodiments of the present disclosure.
Figure 10C:
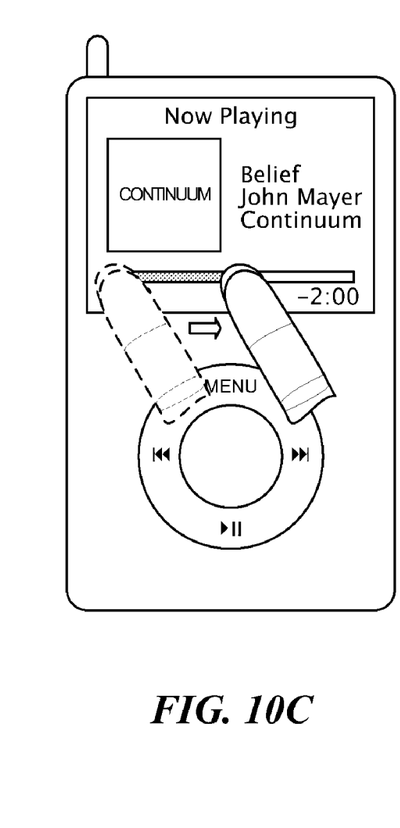
FIG. 10C depicts a front plan view of an exemplary handheld electronic device in accordance with various embodiments of the present disclosure.

As yet another illustrative example, in a media player application, while playing a movie or song, or other audio or video content, dragging with the second surface of the finger may be used to scrub through the content, i.e., move the currently viewed or heard part of it backwards or forwards in order to locate something in it quickly, as depicted in FIGS. 10A-10C.

The foregoing examples are provided as illustrative examples of uses in which a first surface of a finger can be used to drive a first event system and a second, distinguishable surface of a finger can be used to drive a second event system. In various embodiments, the first surface may generally correspond to a flesh surface of a finger, while the second surface may generally correspond to a non-flesh surface of a finger (such as a fingernail or finger cap, etc.), or vice versa. The examples provided in the present specification are examples only and are not intended to be exhaustive or limiting. Furthermore, additional gestures may be implemented in accordance with the principles of the present disclosure. For example, a combination of finger surfaces may be used to implement additional gestures in connection with a multi-point touch screen which is capable of sensing multiple points at the same time. The combination may comprise, for example, a combination of two or more flesh surfaces, a combination of two or more non-flesh surfaces, or a combination of at least one flesh surface and at least one non-flesh surface, etc.

Further modifications and alternative embodiments will be apparent to those skilled in the art in view of this disclosure. Accordingly, this description is to be construed as illustrative only and is for the purpose of teaching those skilled in the art the manner of carrying out the invention. It is to be understood that the forms of the invention herein shown and described are to be taken as exemplary embodiments. Various modifications may be made without departing from the scope of the invention. For example, equivalent elements or materials may be substitute for those illustrated and described herein, and certain features of the invention may be utilized independently of the use of other features, all as would be apparent to one skilled in the art after having the benefit of this description of the invention. In addition, the terms "a" and "an" are generally used in the present disclosure to mean one or more.

The invention claimed is:

1. A multi-event input method comprising:
   detecting an object in contact with or in proximity to a touch-surface display;
   determining a particular input state of the object selected from a plurality of input states including at least a touch state and a hovering in-range state;
   if the touch state is determined, discriminating between a first contact and a second contact, wherein the first contact is between the touch-surface display and a flesh surface, and the second contact is between the touch-surface display and a non-flesh surface;
   using the first contact to drive a first event; and
   using the second contact to drive a second event.

2. The method as recited in claim 1, wherein the flesh surface comprises a palmar aspect of a finger.

3. The method as recited in claim 1, wherein the non-flesh surface comprises a fingernail.

4. The method as recited in claim 1, wherein the non-flesh surface comprises an electrically insulative material coupled to a finger.

5. The method as recited in claim 1, wherein the second event comprises a hover event.

6. The method as recited in claim 1, wherein the first event comprises a touch event and the second event comprises a proximity event.

7. A program storage device, readable by a programmable control device, comprising instructions stored thereon for causing the programmable control device to perform the method as recited in claim 1.

8. A computer-readable storage medium having computer-executable instructions for performing the method as recited in claim 1.

9. A computer-implemented method for processing multiple types of touch inputs, the method comprising:
   detecting an object in contact with or in proximity to a touch-surface display;

determining a particular input state of the object selected from a plurality of input states including at least a touch state and a hovering in-range state;

if the touch state is determined, determining whether the object comprises a flesh aspect or a non-flesh aspect of a finger;

if the object comprises a flesh aspect, driving a first event; and if the object comprises a non-flesh aspect, driving a second event.

10. The method as recited in claim 9, wherein the non-flesh aspect comprises a fingernail.

11. The method as recited in claim 9, wherein the non-flesh aspect comprises an electrically insulative material coupled to a finger.

12. The method as recited in claim 9, wherein the second event comprises a hover event.

13. The method as recited in claim 9, wherein the first event comprises a touch event and the second event comprises a proximity event.

14. The method as recited in claim 9, wherein the second event is configured to invoke a rollover.

15. The method as recited in claim 9, wherein the second event is configured to invoke a tooltip.

16. The method as recited in claim 9, wherein the second event is configured to invoke a phone number tooltip.

17. The method as recited in claim 9, wherein the second event is configured to invoke selection of text.

18. The method as recited in claim 9, wherein the second event is configured to invoke a zoom box.

19. The method as recited in claim 9, wherein the second event is configured to invoke configuration of an icon grid.

20. The method as recited in claim 9, wherein the second event is configured to invoke an action menu.

21. The method as recited in claim 9, wherein the second event is configured to invoke capitalization of a letter key.

22. The method as recited in claim 9, wherein the second event is configured to invoke toggling of a shift key.

23. The method as recited in claim 9, wherein the second event is configured to invoke deletion of a word.

24. The method as recited in claim 9, wherein the second event is configured to invoke deletion of a phone number.

25. The method as recited in claim 9, wherein the second event is configured to invoke advanced navigation of a calendar.

26. The method as recited in claim 9, wherein the second event is configured to invoke a user interface for cropping a photo.

27. The method as recited in claim 9, wherein the second event is used to invoke advanced navigation of an alphabetical list.

28. The method as recited in claim 9, wherein the second event is used to invoke scrubbing media.

29. The method of claim 9, wherein the plurality of input states further includes an out-of-range state.

30. The method of claim 9, wherein the hovering in-range state is determined when the object is hovering while approaching the touch-sensitive display surface.

31. A touch input system comprising:

a display device for displaying a graphical user interface and operatively coupled to a touch surface;

a device driver operatively coupled to the touch surface, the device driver configured for detecting an object in contact with or in proximity to the touch surface, determining a particular input state of the object selected from a plurality of input states including at least a touch state and a hovering in-range state, and if the touch state is determined, determining whether the object comprises a flesh contact or a non-flesh contact; and a window server configured to receive information from the device driver pertaining to the one or more input states and to convert the information into one or more events for dispatch to an application.

32. The system as recited in claim 31, wherein the touch surface comprises a touch screen positioned in front of the display device.

33. The system as recited in claim 31, wherein the touch surface comprises a touch pad.

34. The system as recited in claim 31, wherein at least one of the one or more input states is selected from the group consisting of the following: touching with flesh; not touching with flesh; in-range of a tracking area; and out-of-range of the tracking area.

35. The system as recited in claim 31, wherein at least one of the one or more events is selected from the group consisting of the following: left mouse button down; left mouse button up; mouse entered a tracking area; mouse exited the tracking area; mouse moved without pressing the left mouse button; and mouse dragged while pressing the left mouse button.

36. The system as recited in claim 31, further comprising an imaging chip operatively coupled to the touch surface.

37. A portable electronic device comprising:

a display device for displaying a graphical user interface operatively coupled to a touch surface;

a device driver operatively coupled to the touch surface, the device driver configured for detecting an object in contact with or in proximity to the touch surface, determining a particular input state of the object selected from a plurality of input states including at least a touch state and a hovering in-range state, and if the touch state is determined, determining whether the object comprises a flesh contact or a non-flesh contact;

a window server configured to receive information from the device driver pertaining to the one or more input states and to convert the information into one or more events for dispatch to an application; and a processor unit operatively coupled to the display device, wherein the application is executable within the processor unit.

38. The electronic device as recited in claim 37, wherein at least one of the one or more input states is selected from the group consisting of the following: touching with flesh; not touching with flesh; in-range of a tracking area; and out-of-range of the tracking area.

39. The electronic device as recited in claim 37, wherein at least one of the one or more events is selected from the group consisting of the following: left mouse button down; left mouse button up; mouse entered a tracking area; mouse exited the tracking area; mouse moved without pressing the left mouse button; and mouse dragged while pressing the left mouse button.

40. The electronic device as recited in claim 37, further comprising an imaging chip operatively coupled to the touch screen.

41. The electronic device as recited in claim 37, wherein the electronic device comprises a device selected from the group consisting of the following: a laptop computer; a tablet computer; a handheld computer; a wrist-worn computer; a PDA; a smart phone; a telephone; a media player; a game console; a navigation device; and an exercise monitor device.

* * * * *